(12) United States Patent
Oda

(10) Patent No.: US 6,495,829 B1
(45) Date of Patent: Dec. 17, 2002

(54) THERMAL INFRARED ARRAY SENSOR FOR DETECTING A PLURALITY OF INFRARED WAVELENGTH BANDS

(75) Inventor: Naoki Oda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/481,678

(22) Filed: Jan. 12, 2000

(30) Foreign Application Priority Data

Jan. 12, 1999 (JP) .......................... 11-005536

(51) Int. Cl.[7] ............... G01J 5/02; G01J 5/00; H01L 31/08
(52) U.S. Cl. ............... 250/339.02; 250/338.1; 338/18
(58) Field of Search ............... 250/339.01, 339.02, 250/332, 338.1; 338/18, 22 R, 23

(56) References Cited

U.S. PATENT DOCUMENTS

| | | | | |
|---|---|---|---|---|
| 5,656,816 A | * | 8/1997 | Tanaka | 250/339.01 |
| 5,747,863 A | * | 5/1998 | Shoda | 250/339.02 |
| 5,841,137 A | * | 11/1998 | Whitney | 250/339.02 |
| 6,034,369 A | * | 3/2000 | Oda | 250/338.1 |

FOREIGN PATENT DOCUMENTS

| | | |
|---|---|---|
| JP | 8-105794 | 4/1996 |
| JP | 8-201177 | 8/1996 |
| JP | 9-203659 | 8/1997 |
| JP | 10-38677 | 2/1998 |
| JP | 10-163539 | 6/1998 |
| JP | 10-274561 | 10/1998 |
| JP | 10-288550 | 10/1998 |
| JP | 10-335681 | 12/1998 |

OTHER PUBLICATIONS

SPIE Proceedings Infrared Technology XIX (US) (1993) vol. 2020, p. 330–339.

* cited by examiner

Primary Examiner—Georgia Epps
Assistant Examiner—Alicia M Harrington
(74) Attorney, Agent, or Firm—Young & Thompson

(57) ABSTRACT

An infrared array sensor having an array of infrared sensors of different plural types for detecting infrared rays of different plural wavelength bands. Each sensor includes a diaphragm separated from a substrate by a thermally insulating cavity. The heighths of one of the diaphragm and the cavity are different in each of the plural types of sensors.

10 Claims, 15 Drawing Sheets cross section 5-1 cross section 5-2 cross section 5-1    cross section 5-2 cross section 7-1    cross section 7-2 cross section 9-1    cross section 9-2 cross section 11-1        cross section 11-2

THERMAL INFRARED ARRAY SENSOR FOR DETECTING A PLURALITY OF INFRARED WAVELENGTH BANDS

BACKGROUND OF THE INVENTION

The present invention relates to a thermal infrared array sensor for detecting a plurality of infrared wavelength bands.

FIG. 1A is a schematic perspective view illustrative of a conventional thermistor bolometer thermal infrared array sensor. FIG. 1B is a fragmentary cross sectional elevation view illustrative of a conventional thermistor bolometer thermal infrared array sensor of FIG. 1A. The conventional thermistor bolometer thermal infrared array sensor is disclosed by R. A. Wood, "Uncooled Infrared Image Arrays and Systems", Semiconductors and Semimetals", vol. 17, volume editors P. W. Kruse & D. D. Skatrud Academic Press, 1997, p. 103. The conventional thermistor bolometer thermal infrared array sensor is formed over a silicon substrate 308. The conventional thermistor bolometer thermal infrared array sensor comprises a diaphragm 301 and beams 302 and a read out circuit 307. The diaphragm 301 comprises a bolometer material thin film Vox 305 having a large temperature coefficient of zero-power resistance and protective films SiN 306 which sandwich and surround the bolometer material thin film Vox 305. The beams 302 mechanically support the diaphragm 301 so that the diaphragm 301 is floated over the upper surface of the read out circuit 307. The beams 302 are further provided with electric wirings which comprise metal thin films of NiCr having a low thermal conductivity, The read out circuit 307 is formed in an upper region of the silicon substrate 308. A full reflective film 304 is provided over the read out circuit 307. A cavity 309 is formed between the diaphragm 301 and the surface of the silicon substrate 308. An infrared ray 300 is incident into the diaphragm 301 and a part of the incident infrared ray 300 is absorbed into the SiN protective films 306 whilst a remaining part of the incident infrared ray 300 is transmitted through the diaphragm 301 and the cavity 309 to the full reflective film 304, whereby the remaining part of the incident infrared ray 300 is fully reflected by the full reflective film 304 and then absorbed into the SiN protective films 306. The absorption of the infrared ray 300 causes a temperature rising of the diaphragm 301. The temperature rising of the diaphragm 301 causes variation in a resistance of the bolometer whereby variation in voltage can be detected If a temperature of a sample is lower than the original temperature of the diaphragm 301, then the diaphragm 301 shows a heat radiation to cause a temperature drop of the diaphragm 301, whereby the resistance of the bolometer is varied. The infrared ray absorption band of the SiN protective films 306 is 10 micrometers wavelength band, for which reason the above thermal infrared sensor is operable in this wavelength band.

FIG. 2A is a schematic perspective view illustrative of a conventional ferroelectric infrared array sensor. FIG. 2B is a fragmentary cross sectional elevation view illustrative of a conventional ferroelectric infrared array sensor of FIG. 2A The conventional ferroelectric infrared array sensor is disclosed by C. H. Hansen, SPIE Proc. 2020 vol. 1993, p. 330. The conventional ferroelectric infrared array sensor has a hybrid structure of ferroelectric ceramics 401 and a read out circuit 402 which are electrically connected via bumps 403. An array of the ferroelectric ceramics 401 is provided on an infrared absorption layer 404. Electrodes 408 are provided on the ferroelectric ceramics 401. The electrodes 408 are electrically connected through the bumps 403 to the read out circuit 402. The infrared absorption layer 404 comprises a cavity layer 406 having a first surface on which an infrared absorption film 405 is provided and a second surface opposite to the first surface, where on the second surface, a full reflective film 407 is provided. The ferroelectric ceramics 401 are provided on the full reflective film 407. Each of the bumps 403 has an electric wiring 409 for electrically connect the electrode 408 to the read out circuit 402. The conventional ferroelectric infrared array sensor is different in infrared absorption mechanism from the thermistor bolometer thermal infrared array sensor of FIG. 1A. An infrared ray 400 is incident into the infrared absorption layer 404. A part of the incident infrared ray 400 is reflected by the infrared absorption film 405. A remaining part of the incident infrared ray 400 is transmitted through the cavity layer 406 to the full reflective film 407. The remaining part of the infrared ray 400 is reflected by the full reflective film 407 and then transmitted through the cavity layer 406 to the infrared absorption film 405 The reflected infrared ray 400 is absorbed into the infrared absorption film 405. The above two reflected infrared rays show interference to cancel to each other in the infrared absorption film 405 so that the infrared rays are absorbed into free electrons in the infrared absorption film 405. The absorbed infrared rays are converted into a heat which causes a variation in dielectric constant of the ferroelectric ceramics 401 of $(Ba, Sr)TiO_3$. The variation of the dielectric constant of the ferroelectric ceramics 401 causes a voltage variation. This infrared array sensor has a uniform thickness of the cavity layer, for which reason all pixels can detect the same wavelength band.

FIG. 3 is a schematic perspective view illustrative of a conventional dual band HgCdTe infrared array sensor which is different from the thermal infrared array sensors us shown in FIGS. 1A and 2A. The conventional dual band HgCdTe infrared array sensor has a hybrid structure of a silicon read out circuit and a two dimensional HgCdTe photo-diode array. The conventional dual band HgCdTe infrared array sensor is capable of detecting two different infrared wavelength bands concurrently in the same pixel. The conventional dual band HgCdTe infrared array sensor is thus of a dual band quantum infrared array sensor, In FIG. 3, the illustration of the silicon read out circuit is omitted. The conventional dual band HgCdTe infrared array sensor is disclosed in U.S. Pat. No. 5,149,956 issued to P. R. Norton. Each pixel 501 is formed on a CdZnTe substrate 502 which is transparent to infrared ray. The each pixel 501 comprises an $n-Hg_{0.7}Cd_{0.3}Te$ layer 503, a $p-Hg_{0.6}Cd_{0.4}Te$ layer 504, and an $n-Hg_{0.8}Cd_{0.2}Te$ layer 505. The $n-Hg_{0.7}Cd_{0.3}Te$ layer 503 absorbs an infrared ray of a wavelength band of 3–5 micrometers. The $n-Hg_{0.7}Cd_{0.3}Tc$ layer 503 has an energy band gap of about 0.24 eV and a thickness of 10 micrometers. The $p-Hg_{0.6}Cd_{0.4}Te$ layer 504 has a larger energy band gap than the $n-Hg_{0.7}Cd_{0.3}Te$ layer 503. The $n-Hg_{0.8}Cd_{0.2}Te$ layer 505 absorbs an infrared ray of a wavelength band of 10 micrometers. The $n-Hg_{0.8}Cd_{0.2}Te$ layer 505 has an energy band gap of about 0.1 eV and a thickness of 10 micrometers. An In bump 506 is provided to mechanically and electrically connect the $n-Hg_{0.7}Cd_{0.3}Te$ layer 503 to the read out circuit not illustrated. An In bump 507 is provided to mechanically and electrically connect the $p-Hg_{0.6}Cd_{0.4}Te$ layer 504 to the read out circuit not illustrated. An In bump 508 is provided to mechanically and electrically connect the $n-Hg_{0.8}Cd_{0.2}Te$ layer 505 to the read out circuit not illustrated. The $p-Hg_{0.6}Cd_{0.4}Te$ layer 504 extends over the entire of the array to serve as a common electrode. The $n-Hg_{0.7}Cd_{0.3}Te$ layer 503 and the $n-Hg_{0.8}Cd_{0.2}Te$ layer 505 are independently provided for each pixel, so that each pixel has an independent npn stricture so that each pixel 501 can detect infrared rays of two different wavelengths.

First and second infrared rays 500 having short and long wavelengths are incident to the CdZnTe substrate 502. The first infrared ray 500 having the short wavelength is absorbed into the n-$Hg_{0.7}Cd_{0.3}Te$ layer 503 and the p-$Hg_{0.6}Cd_{0.4}Te$ layer 504. The second infrared ray 500 having the long wavelength is absorbed into the n-$Hg_{0.8}Cd_{0.2}Te$ layer 505. The first infrared ray 500 having the short wavelength is detected as a photoelectric current by a p-n junction between the n-$Hg_{0.7}Cd_{0.3}Te$ layer 503 and the p-$Hg_{0.6}Cd_{0.4}Te$ layer 504. The second infrared ray 500 having the long wavelength is is detected as a photoelectric current by a p-n junction between the p-$Hg_{0.6}Cd_{0.4}Te$ layer 504 and the n-$Hg_{0.8}Cd_{0.2}T$ layer 505. The detected photoelectric currents are transmitted through the indium bumps 506, 507 and 508 to the silicon read out circuit.

The thermal uncooled infrared array sensors shown in FIGS. 1A and 2A are disadvantageous in difficulty of plural infrared wavelength bands in the single device. The HgCdTe dual band infrared array sensor shown in FIG. 3 is disadvantageous in difficulty of three or more infrared wavelength bands and also in need to cool the device to operate the same.

In the above circumstances, it had been required to develop a novel thermal uncooled infrared array sensor free from the above problems.

SUMMARY OF THE INVENTION

Accordingly, it is an object of the present invention to provide a novel thermal uncooled infrared array sensor free from the above problems.

It is a further object of the present invention to provide a novel thermal uncooled infrared array sensor, wherein a single sensor is capable of detecting infrared rays of plural different wavelength bands.

The present invention provides an infrared array sensor having an array of infrared sensors of different plural types for detecting infrared rays of different plural wavelength bands.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

Figure 1A:
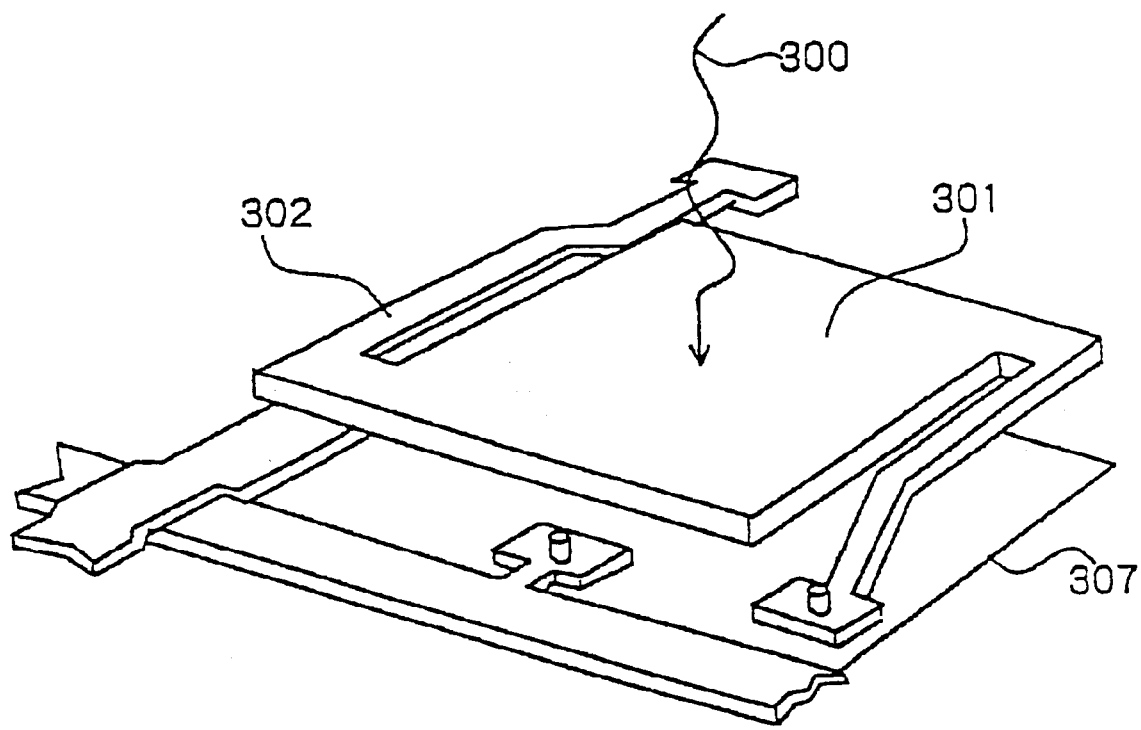
FIG. 1A is a schematic perspective view illustrative of a conventional thermistor bolometer thermal infrared array sensor.
Figure 1B:
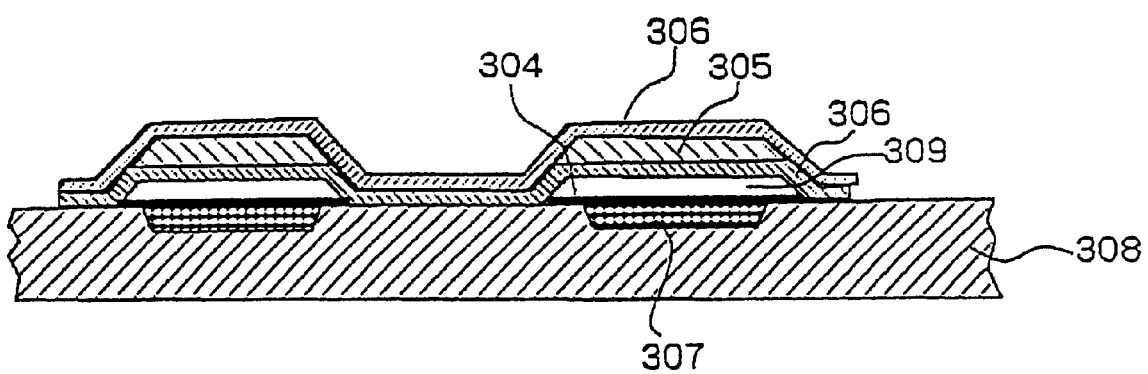
FIG. 1B is a fragmentary cross sectional elevation view illustrative of a conventional thermistor bolometer thermal infrared array sensor of FIG. 1A.
Figure 2A:
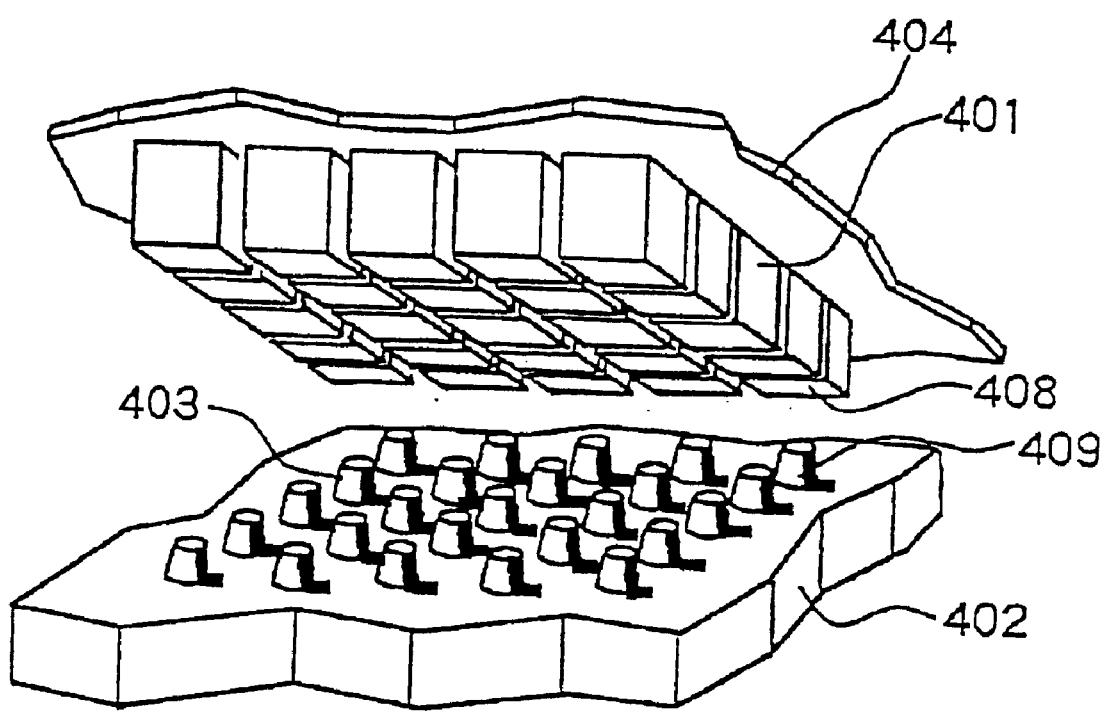
FIG. 2A is a schematic perspective view illustrative of a conventional ferroelectric infrared array sensor.
Figure 2B:
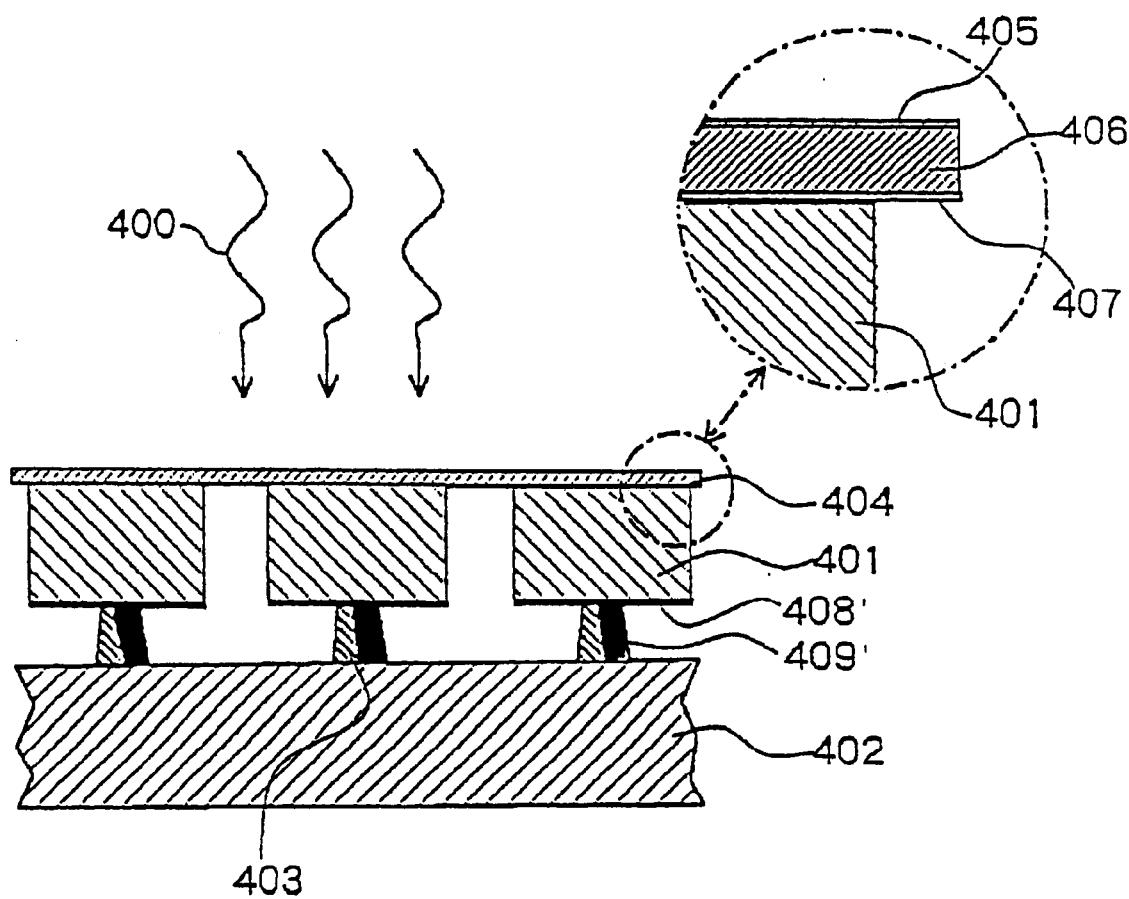
FIG. 2B is a fragmentary cross sectional elevation view illustrative of a conventional ferroelectric infrared array sensor of FIG. 2A.
Figure 3:
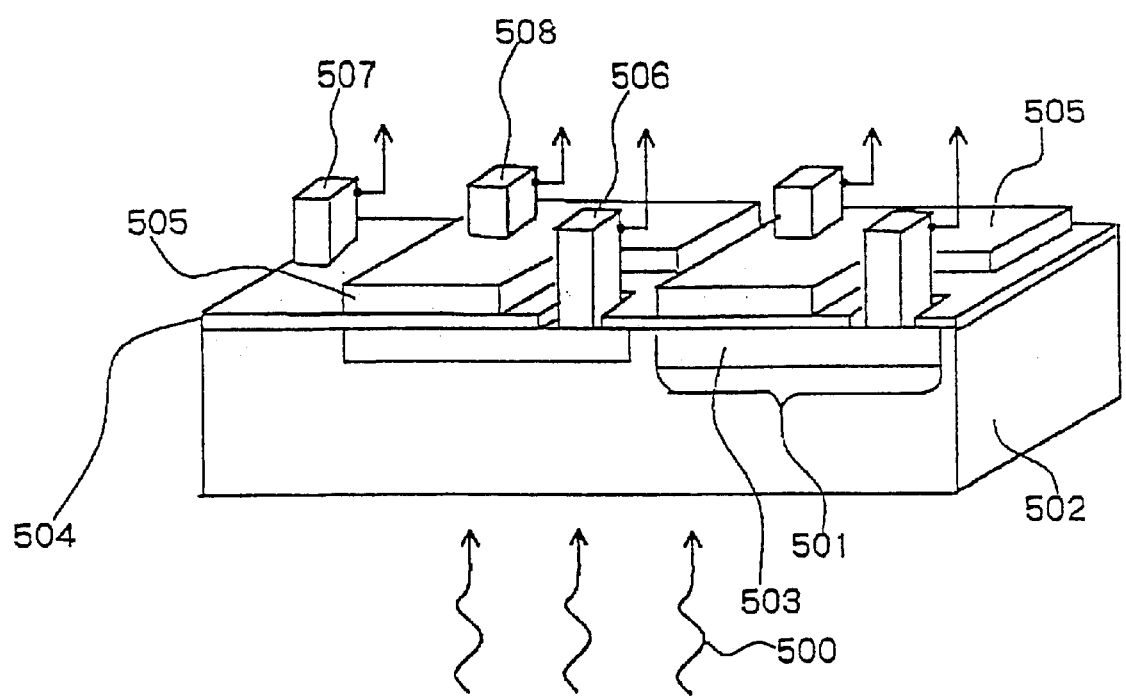
FIG. 3 is a schematic perspective view illustrative of a conventional dual band HgCdTe infrared array sensor which is different from the thermal infrared array sensors as shown in FIGS. 1A and 2A

The first present invention provides an infrared array sensor having an array of infrared sensors of different plural types for detecting infrared rays of different plural wavelength bands.

It is possible that the infrared sensors of one type for detecting the infrared rays of one wavelength band are widely distributed over an entire of the infrared array sensor without being localized, and the infrared sensors of other type for detecting the infrared rays of other wavelength band are also widely distributed over the entire of the infrared array sensor without being localized.

It is further possible that the infrared sensors of one type for detecting the infrared rays of one wavelength band are distributed to form alignments in row direction, and the infrared sensors of other type for detecting the infrared rays of other wavelength band are also distributed to form alignments in row direction.

It is further more possible that alignments of the infrared sensors of one type and alignments of the infrared sensors of one type are alternately arranged.

It is also possible that the infrared sensors of one type for detecting the infrared rays of one wavelength band are distributed to form alignments in column direction, and the infrared sensors of other type for detecting the infrared rays of other wavelength band are also distributed to form alignments in column direction.

It is further possible that alignments of the infrared sensors of one type and alignments of the infrared sensors of one type arc alternately arranged.

It is also possible that the infrared sensors of one type for detecting the infrared rays of one wavelength band are distributed in random, and the infrared sensors of other type for detecting the infrared rays of other wavelength band are also distributed in random.

It is also possible that the infrared array sensor comprises a thermistor bolometer infrared array sensor.

It is further possible that the infrared sensors comprise diaphragms which are supported by beams and floated over a substrate having read out circuits.

It is further more possible that the infrared sensors of one type comprises a first diaphragm floated over a first cavity over a first full reflective film on a surface of the substrate, and the first diaphragm further comprises a first bolometer material thin film transparent to an infrared ray and first and second protective films sandwiching the first bolometer material thin film and absorbing an infrared ray, and that the infrared sensors of other type comprises a second diaphragm floated over a second cavity over a second full reflective film on the surface of the substrate and an infrared ray absorption thin film on the second diaphragm, and the second diaphragm further comprises a second bolometer material thin film transparent to the infrared ray and third and fourth protective films sandwiching the second bolometer material thin film and being transparent to the infrared ray, and a distance between the infrared ray absorption thin film and the second full reflective film is a multiple of one quarter of a wavelength of an infrared ray to be detected by the infrared sensor of the other type.

It is also possible that the infrared sensors of one type comprises a first diaphragm floated over a first cavity over a first full reflective film on a surface of the substrate and a first infrared ray absorption thin film on the first diaphragm, and the first diaphragm further comprises a first bolometer material thin film transparent to the infrared ray and first and second protective films sandwiching the first bolometer material thin film and being transparent to the infrared ray, and a distance between the first infrared ray absorption thin film and the first full reflective film is a multiple of one quarter of a first wavelength of an infrared ray to be detected by the infrared sensor of the one type, and that the infrared sensors of other type comprises a second diaphragm floated over a second cavity over a second full reflective film on the surface of the substrate and an infrared ray absorption thin film on the second diaphragm, and the second diaphragm further comprises a second bolometer material thin film transparent to the infrared ray and third and fourth protective films sandwiching the second bolometer material thin film and being transparent to the infrared ray, and a distance between the infrared ray absorption thin film and the second full reflective film is a multiple of one quarter of a second wavelength of an infrared ray to be detected by the infrared sensor of the other type, where the first and second cavities are different in length from each other.

It is also possible that the infrared sensors of one type comprises a first diaphragm floated over a first cavity over a surface of the substrate and a first infrared ray absorption thin film on the first diaphragm, and the first diaphragm further comprises a first bolometer material thin film reflecting the infrared ray and first and second protective films sandwiching the first bolometer material thin film and being transparent to the infrared ray, and a distance between the first infrared ray absorption thin film and the first bolometer material thin film is a multiple of one quarter of a first wavelength of an infrared ray to be detected by the infrared sensor of the one type, and that the infrared sensors of other type comprises a second diaphragm floated over a second cavity over the surface of the substrate and a second infrared ray absorption thin film on the second diaphragm, and the second diaphragm further comprises a second bolometer material thin film reflecting the infrared ray and third and fourth protective films sandwiching the second bolometer material thin film and being transparent to the infrared ray, and a distance between the infrared ray absorption thin film and the second bolometer material thin film is a multiple of one quarter of a second wavelength of an infrared ray to be detected by the infrared sensor of the other type, where the second and fourth protective films are different in thickness from each other.

It is also possible that the infrared sensors of one type comprises a first diaphragm floated over a first cavity over a surface of the substrate, and the first diaphragm further comprises a first bolometer material thin film reflecting an infrared ray and first and second protective films sandwiching the first bolometer material thin film and absorbing an infrared ray, and that the infrared sensors of other type comprises a second diaphragm floated over a second cavity over the surface of the substrate and a second infrared ray absorption thin film on the second diaphragm, and the second diaphragm further comprises a second bolometer material thin film reflecting the infrared ray and third and fourth protective films sandwiching the second bolometer material thin film and being transparent to the infrared ray, and a distance between the infrared ray absorption thin film and the second bolometer material thin film is a multiple of one quarter of a wavelength of an infrared ray to be detected by the infrared sensor of the other type.

It is possible that the infrared array sensor comprises a ferroelectric infrared array sensor.

It is further possible that the infrared array sensor of one type has a first cavity layer sandwiched between a first infrared absorption thin film and a first full reflective layer, and the first cavity layer has a first thickness of a multiple of one quarter of a first wavelength band of the infrared ray, and the infrared array sensor of other type has a second cavity layer sandwiched between a second infrared absorption thin film and a second full reflective layer, and the second cavity layer has a second thickness different from the first thickness and the second thickness is a multiple of one quarter of a second wavelength band of the infrared ray.

The second present invention provides a thermistor bolometer infrared array sensor having an array of infrared sensors of different plural types for detecting infrared rays of different plural wavelength bands, wherein the infrared sensors comprise diaphragms which are supported by beams and floated over a substrate having read out circuits, and wherein the infrared sensors of one type for detecting the infrared rays of one wavelength band are widely distributed over an entire of the infrared array sensor without being localized, and the infrared sensors of other type for detecting the infrared rays of other wavelength band are also widely distributed over the entire of the infrared array sensor without being localized.

It is possible that the infrared sensors of one type for detecting the infrared rays of one wavelength band are distributed to form alignments in row direction, and the infrared sensors of other type for detecting the infrared rays of other wavelength band are also distributed to form alignments in row direction.

It is further possible that alignments of the infrared sensors of one type and alignments of the infrared sensors of one type are alternately arranged.

It is also possible that the infrared sensors of one type for detecting the infrared rays of one wavelength band are distributed to form alignments in column direction, and the infrared sensors of other type for detecting the infrared rays of other wavelength band are also distributed to form alignments in column direction.

It is further possible that alignments of the infrared sensors of one type and alignments of the infrared sensors of one type are alternately arranged.

It is also possible that the infrared sensors of one type for detecting the infrared rays of one wavelength band are distributed in random, and the infrared sensors of other type for detecting the infrared rays of other wavelength band are also distributed in random.

It is also possible that the infrared sensors of one type comprises a first diaphragm floated over a first cavity over a first full reflective film on a surface of the substrate, and the first diaphragm further comprises a first bolometer material thin film transparent to an infrared ray and first and second protective films sandwiching the first bolometer material thin film and absorbing an infrared ray, and that the infrared sensors of other type comprises a second diaphragm floated over a second cavity over a second full reflective film on the surface of the substrate and an infrared ray absorption thin film on the second diaphragm, and the second diaphragm further comprises a second bolometer material thin film transparent to the infrared ray and third and fourth protective films sandwiching the second bolometer material thin film and being transparent to the infrared ray, and a distance between the infrared ray absorption thin film and the second full reflective film is a multiple of one quarter of a wavelength of an infrared ray to be detected by the infrared sensor of the other type.

It is also possible that the infrared sensors of one type comprises a first diaphragm floated over a first cavity over a first full reflective film on a surface of the substrate and a first infrared ray absorption thin film on the first diaphragm, and the first diaphragm further comprises a first bolometer material thin film transparent to the infrared ray and first and second protective films sandwiching the first bolometer material thin film and being transparent to the infrared ray, and a distance between the first infrared ray absorption thin film and the first full reflective film is a multiple of one quarter of a first wavelength of an infrared ray to be detected by the infrared sensor of the one type, and that the infrared sensors of other type comprises a second diaphragm floated over a second cavity over a second full reflective film on the surface of the substrate and an infrared ray absorption thin film on the second diaphragm, and the second diaphragm further comprises a second bolometer material thin film transparent to the infrared ray and third and fourth protective films sandwiching the second bolometer material thin film and being transparent to the infrared ray, and a distance between the infrared ray absorption thin film and the second full reflective film is a multiple of one quarter of a second wavelength of an infrared ray to be detected by the infrared sensor of the other type, where the first and second cavities are different in length from each other.

It is also possible that the infrared sensors of one type comprises a first diaphragm floated over a first cavity over a surface of the substrate and a first infrared ray absorption thin film on the first diaphragm, and the first diaphragm further comprises a first bolometer material thin film reflecting the infrared ray and first and second protective films sandwiching the first bolometer material thin film and being transparent to the infrared ray, and a distance between the first infrared ray absorption thin film and the first bolometer material thin film is a multiple of one quarter of a first wavelength of an infrared ray to be detected by the infrared sensor of the one type, and that the infrared sensors of other type comprises a second diaphragm floated over a second cavity over the surface of the substrate and a second infrared ray absorption thin film on the second diaphragm, and the second diaphragm further comprises a second bolometer material thin film reflecting the infrared ray and third and fourth protective films sandwiching the second bolometer material thin film and being transparent to the infrared ray, and a distance between the infrared ray absorption thin film and the second bolometer material thin film is a multiple of one quarter of a second wavelength of an infrared ray to be detected by the infrared sensor of the other type, where the second and fourth protective films are different in thickness from each other.

It is also possible that the infrared sensors of one type comprises a first diaphragm floated over a first cavity over a surface of the substrate, and the first diaphragm further comprises a first bolometer material thin film reflecting an infrared ray and first and second protective films sandwiching the first bolometer material thin film and absorbing an infrared ray, and that the infrared sensors of other type comprises a second diaphragm floated over a second cavity over the surface of the substrate and a second infrared ray absorption thin film on the second diaphragm, and the second diaphragm further comprises a second bolometer material thin film reflecting the infrared ray and third and fourth protective films sandwiching the second bolometer material thin film and being transparent to the infrared ray, and a distance between the infrared ray absorption thin film and the second bolometer material thin film is a multiple of one quarter of a wavelength of an infrared ray to be detected by the infrared sensor of the other type.

The third present invention provides a ferroelectric infrared array sensor having an array of infrared sensors of different plural types for detecting infrared rays of different plural wavelength bands, wherein the infrared sensors of one type for detecting the infrared rays of one wavelength band are widely distributed over an entire of the infrared array sensor without being localized, and the infrared sensors of other type for detecting the infrared rays of other wavelength band are also widely distributed over the entire of the infrared array sensor without being localized.

It is possible that the infrared sensors of one type for detecting the infrared rays of one wavelength band are distributed to form alignments in row direction, and the infrared sensors of other type for detecting the infrared rays of other wavelength band are also distributed to form alignments in row direction.

It is further possible that alignments of the infrared sensors of one type and alignments of the infrared sensors of one type are alternately arranged.

It is also possible that the infrared sensors of one type for detecting the infrared rays of one wavelength band are distributed to form alignments in column direction, and the infrared sensors of other type for detecting the infrared rays of other wavelength band are also distributed to form alignments in column direction, It is further possible that alignments of the infrared sensors of one type and alignments of the infrared sensors of one type are alternately arranged.

It is also possible that the infrared sensors of one type for detecting the infrared rays of one wavelength band are distributed in random, and the infrared sensors of other type for detecting the infrared rays of other wavelength band are also distributed in random.

It is also possible that the infrared array sensor of one type has a first cavity layer sandwiched between a first infrared absorption thin film and a first full reflective layer, and the first cavity layer has a first thickness of a multiple of one quarter of a first wavelength band of the infrared ray, and the infrared array sensor of other type has a second cavity layer sandwiched between a second infrared absorption thin film and a second full reflective layer, and the second cavity layer has a second thickness different from the first thickness and the second thickness is a multiple of one quarter of a second wavelength band of the infrared ray.

PREFERRED EMBODIMENT

First Embodiment

Figure 4:
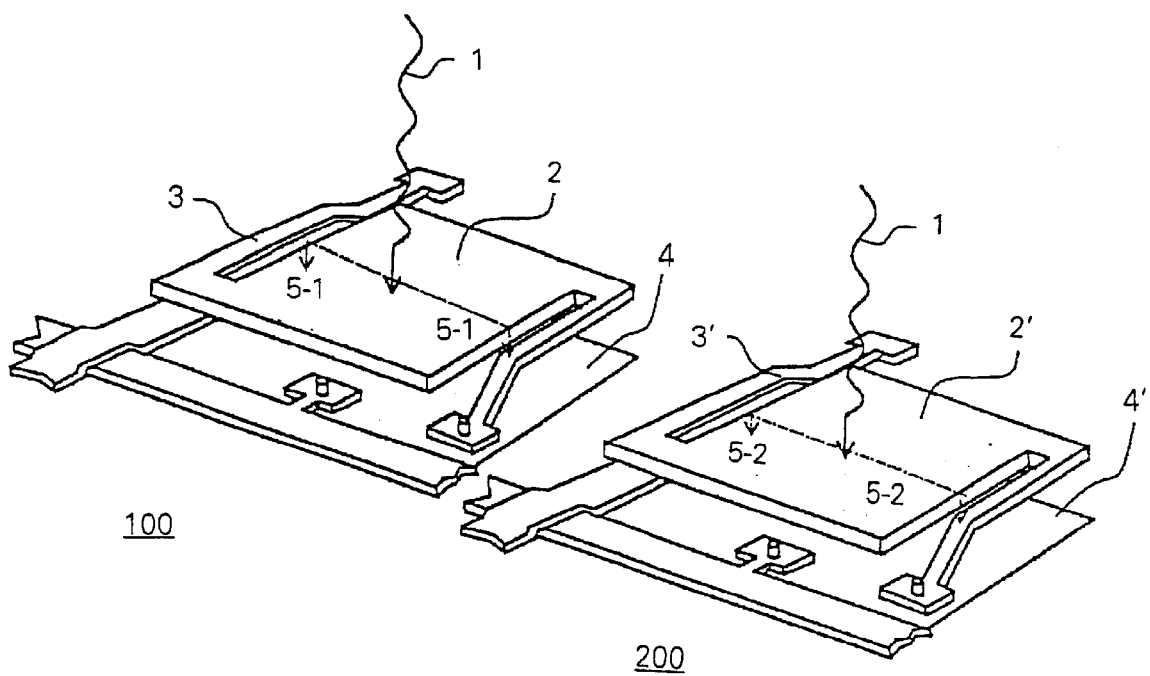
FIG. 4 is a schematic perspective view illustrative of first and second type sensors having first ands second diaphragms for detecting infrared rays of different wavelength bands in a first novel thermistor bolometer thermal infrared array sensor in a first embodiment in accordance with the present invention.

A first embodiment according to the present invention will be described in detail with reference to the drawings. FIG. 4 is a schematic perspective view illustrative of first and second type sensors having first ands second diaphragms for detecting infrared rays of different wavelength bands in a first novel thermistor bolometer thermal infrared array sensor in a first embodiment in accordance with the present invention. The first novel thermistor bolometer thermal infrared array sensor has an array of first and second type sensors 100 and 200. The first and second type sensors 100 and 200 are arranged to form a two-dimensional array. The first type sensors 100 are almost uniformly distributed over an entire region of the array and the second type sensors 200 are almost uniformly distributed over the entire region of the array, The first and second type sensors 100 and 200 are different in wavelength band of the infrared rays to be detected by them. Each of the first type sensor 100 comprises a first diaphragm 2 which is supported and floated by first beams 3 over a read out circuit board 4. Each of the second type sensor 200 comprises a second diaphragm 2' which is supported and floated by second beams 3' over the read out circuit board 4. Each of the first and second type sensors 100 and 200 corresponds to each pixel of the thermistor bolometer thermal infrared array sensor. A size of the each pixel is in the range of 30–100 micrometers.

Figure 5:
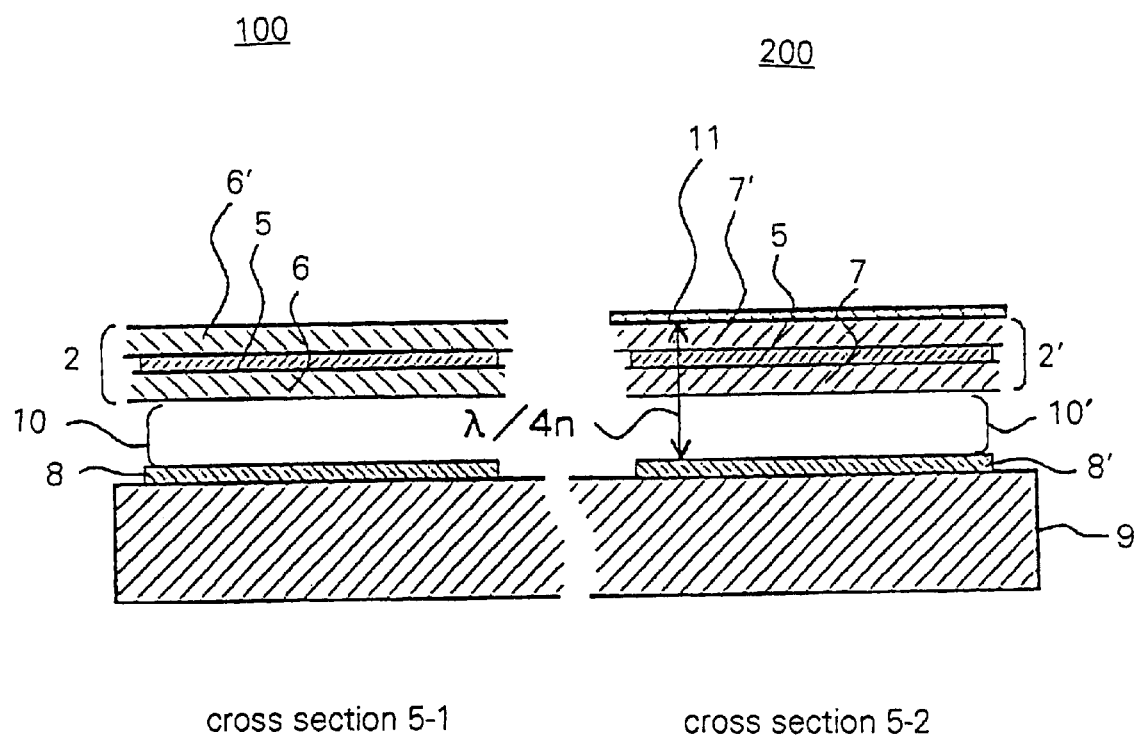
FIG. 5 is a fragmentary cross sectional elevation view illustrative of a first novel thermistor bolometer thermal infrared array sensor capable of plural infrared wavelength bands taken along A—A line and B—B line of FIG. 4 in a first embodiment in accordance with the present invention.

FIG. 5 is a fragmentary cross sectional elevation view illustrative of a first novel thermistor bolometer thermal infrared array sensor capable of plural infrared wavelength bands taken along A—A line and B—B line of FIG. 4 in a first embodiment in accordance with the present invention, wherein the adjacent first and second types pixels are illustrated. The bolometer thin film is made of a metal oxide which is transparent to the infrared ray.

A first diaphragm 2 of the first type pixel comprises a first bolometer material thin film 5 sandwiched between first and second protective films 6 and 6'. The first read out circuit 4 of the first type pixel is formed in a surface of a substrate 9. A first full reflective film 8 is provided on the surface of the substrate 9. A first cavity 10 is formed between the first diaphragm 2 and the first full reflective film 8. The first and second protective films 6 and 6' are made of SiN and have a total thickness of about 5000 angstroms. The first and second protective films 6 and 6' absorb an infrared ray of a wavelength band of 10 micrometers. The first full reflective film 8 is made of a metal such as Al, Ti or WSi. The first full reflective film 8 has a thickness of about 2000 angstroms. A size of the cavity 10 or a distance between the first diaphragm 2 and the full reflective film 8 is not limited.

The infrared ray is incident into the first diaphragm 2. A part of the incident infrared ray is absorbed into the first and second protective films 6 and 6'. A remaining part of the incident infrared ray is transmitted through the cavity 10 to the full reflective film 8, so that the remaining part of the incident infrared ray is reflected by the full reflective film 8. The reflected infrared ray is transmitted through the cavity 10 to the first diaphragm 2. The reflected infrared ray is absorbed into the first and second protective films 6 and 6'. The absorption of the infrared ray causes variation in temperature of the first diaphragm 2, whereby a resistance of the bolometer in the first diaphragm 2 is changed, thereby causing a voltage variation. This voltage variation is converted into electrical signals which are to be processed for imaging.

A second diaphragm 2' of the second type pixel comprises a second bolometer material thin film 5' sandwiched between first and second protective films 7 and 7'. An infrared absorption thin film 11 is provided on the second diaphragm 2' or on the second protective film 7' of the diaphragm 2'. The second read out circuit 4' of the second type pixel is formed in the surface of the substrate 9. A second full reflective film 8' is provided on the surface of the substrate 9. A second cavity 10' is formed between the second diaphragm 2' and the second full reflective film 8'. The first and second protective films 7 and 7' are made of $SiO_2$ which are almost transparent to the infrared ray. The infrared absorption thin film 11 has a vacuum impedance matching, The infrared absorption thin film 11 may comprise either a TiN layer hating a thickness of about 150 angstroms or an NiFe layer having a thickness of about 30 angstroms. The infrared absorption thin film 11 has a sheet resistance of 377 ohms. The second full reflective film 8 is made of a metal such as Al, Ti or WSi. The second full reflective film 8 has a thickness of about 2000 angstroms. A size of the cavity 10 or a distance between the second diaphragm 2 and the full reflective film 8 is not limited.

An infrared ray 1 is incident into the second diaphragm 2'. A part of the incident infrared ray is transmitted through the infrared absorption thin film 11, the second diaphragm 2' and the second cavity 10' to the second full reflective film 8', so that the part of the transmitted infrared ray is reflected by the second full reflective film 8'. The reflected infrared ray is then transmitted through the second cavity 10' and the second diaphragm 2' to the infrared absorption thin film 11, where the reflected infrared ray and the incident infrared ray show an interference to cancel to each other in the infrared absorption thin film 11, whereby the infrared ray is absorbed into the infrared absorption thin film 11. A distance between the infrared absorption thin film 11 and the second full reflective film 8' is set to be $\lambda \, 2/4n$, for example, one quarter of the wavelength band of the infrared ray which is to be detected. For example, if the distance between the infrared absorption thin film 11 and the second full reflective film 8' is set to be 1 micrometer, then the second pixel can detect an infrared ray of 4 micrometers wavelength band. In this case, the total thickness of the first and second protective films 7 and 7' may be 5000 angstroms and the length of the second cavity 10' may be 0.3 micrometers. It is possible to change the wavelength band of the infrared ray to be detected by the second type pixel by changing the length of the second cavity 10'. The absorption of the infrared ray causes variation in temperature of the second diaphragm 2', whereby a resistance of the bolometer in the second diaphragm 2' is changed, thereby causing a voltage variation. This voltage variation is converted into electrical signals which are to be processed for imaging.

Accordingly, the above first and second sensors 100 and 200 having the first ands second diaphragms 2 and 2' are capable of detecting infrared rays of two different wavelength bands. Since the above first and second sensors 100 and 200 are distributed over the entire of the array, the first novel thermistor bolometer thermal infrared array sensor can detect the infrared rays of different wavelength bands.

In this embodiment, the first and second sensors 100 and 200 are provided to detect two different wavelength bands infrared rays. It is, however, possible to modify the first novel thermistor bolometer thermal infrared array sensor by providing three or more different type sensors which are capable of detecting infrared rays of three or more different wavelength bands.

Second Embodiment

Figure 6:
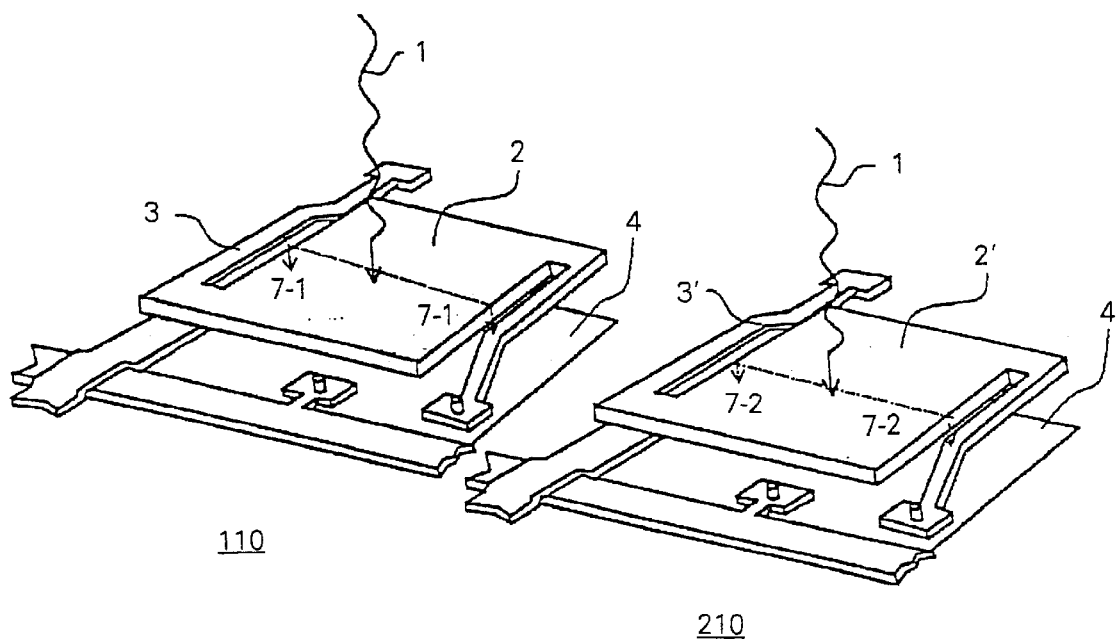
FIG. 6 is a schematic perspective view illustrative of first and second type sensors having first ands second diaphragms for detecting infrared rays of different wavelength bands in a second novel thermistor bolometer thermal infrared array sensor in a second embodiment in accordance with the present invention.

A second embodiment according to the present invention will be described in detail with reference to the drawings. FIG. 6 is a schematic perspective view illustrative of first and second type sensors having first ands second diaphragms for detecting infrared rays of different wavelength bands in a second novel thermistor bolometer thermal infrared array sensor in a second embodiment in accordance with the present invention. The second novel thermistor bolometer thermal infrared array sensor has an array of first and second type sensors 110 and 210. The first and second type sensors 110 and 210 are arranged to form a two-dimensional array. The first type sensors 110 are almost uniformly distributed over an entire region of the array and the second type sensors 210 are almost uniformly distributed over the entire region of the array, The first and second type sensors 110 and 210 are different in wavelength band of the infrared rays to be detected by them. Each of the first type sensor 110 comprises a first diaphragm 2 which is supported and floated by first beams 3 over a read out circuit board 4. Each of the second type sensor 210 comprises a second diaphragm 2' which is supported and floated by second beams 3' over the read out circuit board 4. Each of the first and second type sensors 110 and 210 corresponds to each pixel of the thermistor bolometer thermal infrared array sensor. A size of the each pixel is in the range of 30–100 micrometers.

Figure 7:
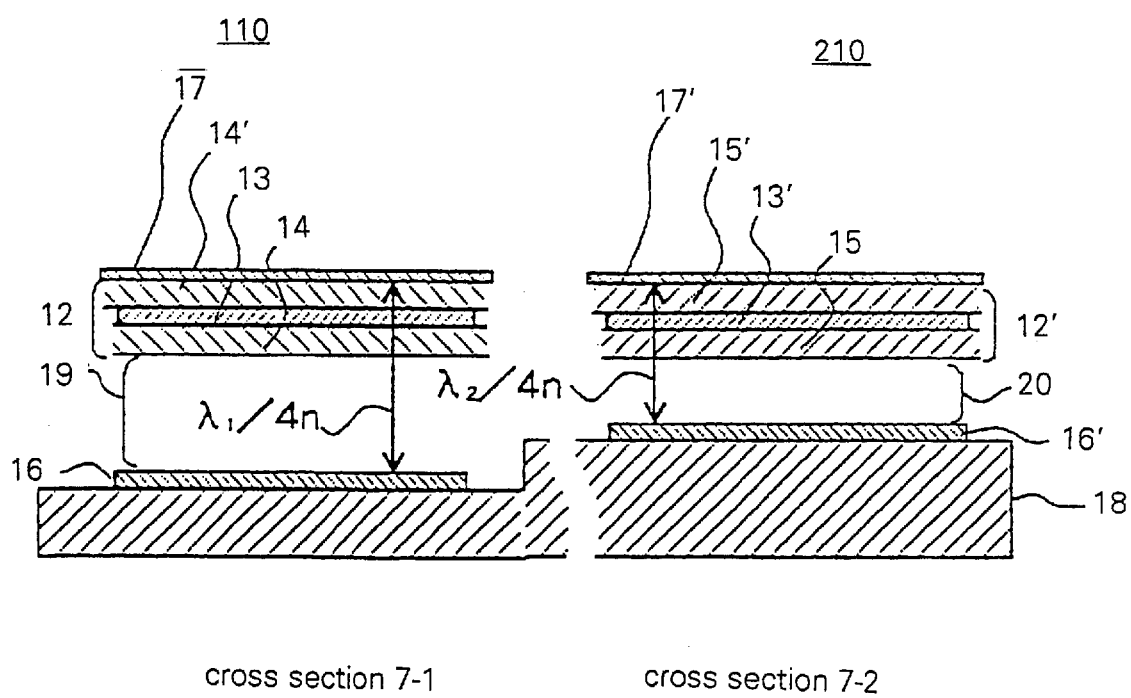
FIG. 7 is a fragmentary cross sectional elevation view illustrative of a second novel thermistor bolometer thermal infrared array sensor capable of plural infrared wavelength bands taken along A—A line and B—B line of FIG. 6 in a second embodiment in accordance with the present invention.

FIG. 7 is a fragmentary cross sectional elevation view illustrative of a second novel thermistor bolometer thermal infrared array sensor capable of plural infrared wavelength bands taken along A—A line and B—B line of FIG. 6 in a second embodiment in accordance with the present invention, wherein the adjacent first and second types pixels are illustrated. The bolometer thin film is made of a metal oxide which is transparent to the infrared ray.

A first diaphragm 12 of the first type pixel comprises a first bolometer material thin film 13 sandwiched between first and second protective films 14 and 14'. The first read out circuit 4 of the first type pixel is formed in a first surface of a substrate 18. A first full reflective film 16 is provided on the first surface of the substrate 18. A first cavity 19 is formed between the first diaphragm 12 and the first full reflective film 16. The first and second protective films 14 and 14' are made of $SiO_2$ which are transparent to the infrared ray. The first bolometer material thin film 13 comprises either a vanadium oxide thin film which is transparent to the infrared ray or a perovskite manganese oxide thin film including an rear earth element. A first infrared absorption thin film 17 is provided on the first diaphragm 12 or on the second protective film 14'. The first infrared absorption thin film 17 has a vacuum impedance matching. The first infrared absorption thin film 17 may comprise either a TiN layer having a thickness of about 150 angstroms or an NiFe layer having a thickness of about 30 angstroms. The first infrared absorption thin film 17 has a sheet resistance of 377 ohms, The first full reflective film 16 is made of a metal such as Al, Ti or WSi. The first full reflective film 16 has a thickness of about 2000 angstroms.

An infrared ray 1 is incident into the first diaphragm 12. A part of the incident infrared ray is transmitted through the first infrared absorption thin film 17, the first diaphragm 12 and the first cavity 19 to the first full reflective film 16, so that the part of the transmitted infrared ray is reflected by the first full reflective film 16. The reflected infrared ray is then transmitted through the first cavity 19 and the first diaphragm 12 to the first infrared absorption thin film 17, where the reflected infrared ray and the incident infrared ray show an interference to cancel to each other in the first infrared absorption thin film 17, whereby the infrared ray is absorbed into the first infrared absorption thin film 17. A distance between the first infrared absorption thin film 17 and the first full reflective film 16 is set to be λ 1/4n, for example, one quarter of the first wavelength band of the first infrared ray which is to be detected by the first type sensor 110. For example, if the distance between the first infrared absorption thin film 17 and the first full reflective film 16 is set to be 2.5 micrometer, then the first type sensor 110 can detect an infrared ray of 10 micrometers wavelength band. In this case, the total thickness of the first and second protective films 14 and 14' may be 5000 angstroms and the length of the first cavity 19 may be 2 micrometers. It is possible to change the wavelength band of the infrared ray to be detected by the first type sensor 110 by changing the length of the first cavity 19. The absorption of the infrared ray causes variation in temperature of the first diaphragm 12, whereby a resistance of the bolometer in the first diaphragm 12 is changed, thereby causing a voltage variation. This voltage variation is converted into electrical signals which are to be processed for imaging.

A second diaphragm 12' of the second type sensor 210 comprises a second bolometer material thin film 13 sandwiched between first and second protective films 15 and 15'. The second read out circuit 4' of the second type sensor 210 is formed on a second surface of the substrate 18. A second full reflective film 16' is provided on the second surface of the substrate 18. A second cavity 20 is formed between the second diaphragm 12' and the second full reflective film 16'. The first and second protective films 15 and 15' are made of $SiO_2$ which are transparent to the infrared ray. The second bolometer material thin film 13' comprises either a vanadium oxide thin film which is transparent to the infrared ray or a perovskite manganese oxide thin film including an rear earth element. A second infrared absorption thin film 17' is provided on the second diaphragm 12' or on the second protective film 15'. The second infrared absorption thin film 17' has a vacuum impedance matching. The second infrared absorption thin film 17' may comprise either a TiN layer having a thickness of about 150 angstroms or an NiFe layer having a thickness of about 30 angstroms. The second infrared absorption thin film 17' has a sheet resistance of 377 ohms. The second full reflective film 16' is made of a metal such as Al, Ti or WSi. The second full reflective film 16' has a thickness of about 2000 angstroms. The second surface of the substrate 18 on which the first type sensor 110 is provided has a higher level than the first surface of the substrate 18 on which the first type sensor 110 is provided, so that the first cavity 19 of the first type sensor 110 is larger in length than the second cavity 20 of the second type sensor 210, An infrared ray 1 is incident into the second diaphragm 12'. A part of the incident infrared ray is transmitted through the second infrared absorption thin film 17', the second diaphragm 12' and the second cavity 20 to the second full reflective film 16', so that the part of the transmitted infrared ray is reflected by the second full reflective film 16'. The reflected infrared ray is then transmitted through the second cavity 20 and the second diaphragm 12' to the second infrared absorption thin film 17', where the reflected infrared ray and the incident infrared ray show an interference to cancel to each other in the second infrared absorption thin film 17', whereby the infrared ray is absorbed into the second infrared absorption thin film 17'. A distance between the second infrared absorption thin film 17' and the second full reflective film 16' is set to be $\lambda$ 2/4n, for example, one quarter of the second wavelength band of the second infrared ray which is to be detected by the second type sensor 210. For example, if the distance between the second infrared absorption thin film 17' and the second full reflective film 16' is set to be 1 micrometer, then the second type sensor 110 can detect an infrared ray of 4 micrometers wavelength band. In this case, the total thickness of the second and second protective films 15 and 15' may be 5000 angstroms and the length of the second cavity 20 may be 0.3 micrometers. It is possible to change the wavelength band of the infrared ray to be detected by the second type sensor 210 by changing the length of the second cavity 20. The absorption of the infrared ray causes variation in temperature of the second diaphragm 12', whereby a resistance of the bolometer in the second diaphragm 12' is changed, thereby causing a voltage variation. This voltage variation is converted into electrical signals which are to be processed for imaging.

Accordingly, the above first and second sensors 110 and 210 having the first ands second diaphragms 12 and 12' are capable of detecting infrared rays of two different wavelength bands. Since the above first and second sensors 110 and 210 are distributed over the entire of the array, the second novel thermistor bolometer thermal infrared array sensor can detect the infrared rays of different wavelength bands.

In this embodiment, the first and second sensors 110 and 210 are provided to detect two different wavelength bands infrared rays. It is, however, possible to modify the second novel thermistor bolometer thermal infrared array sensor by providing three or more different type sensors which are capable of detecting infrared rays of three or more different wavelength bands.

Third Embodiment

Figure 8:
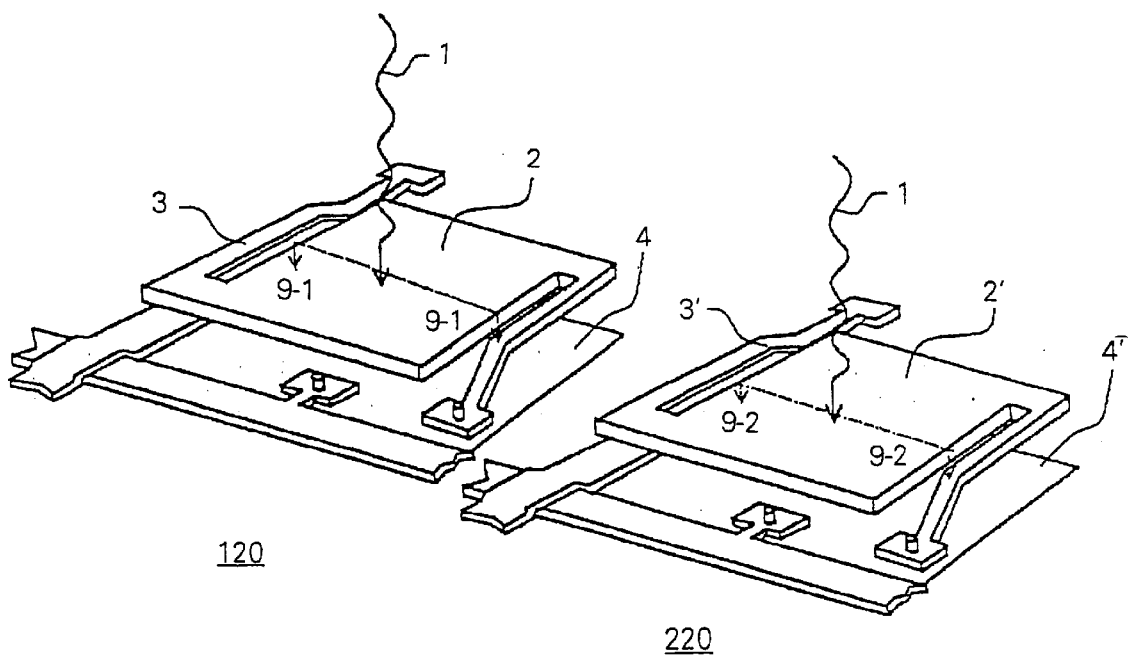
FIG. 8 is a schematic perspective view illustrative of first and second type sensors having first and second diaphragms for detecting infrared rays of different wavelength bands in a third novel thermistor bolometer thermal infrared array sensor in a third embodiment in accordance with the present invention.

A third embodiment according to the present invention will be described in detail with reference to the drawings. FIG. 8 is a schematic perspective view illustrative of first and second type sensors having first and second diaphragms for detecting infrared rays of different wavelength bands in a third novel thermistor bolometer thermal infrared array sensor in a third embodiment in accordance with the present invention. The third novel thermistor bolometer thermal infrared array sensor has an array of first and second type sensors 120 and 220. The first and second type sensors 120 and 220 are arranged to form a two-dimensional array. The first type sensors 120 are almost uniformly distributed over an entire region of the array and the second type sensors 220 are almost uniformly distributed over the entire region of the array. The first and second type sensors 120 and 220 are different in wavelength band of the infrared rays to be detected by them. Each of the first type sensor 120 comprises a first diaphragm 2 which is supported and floated by first beams 3 over a read out circuit board 4. Each of the second type sensor 220 comprises a second diaphragm 2' which is supported and floated by second beams 3' over the read out circuit board 4. Each of the first and second type sensors 120 and 220 corresponds to each pixel of the thermistor bolometer thermal infrared array sensor. A size of the each pixel is in the range of 30–100 micrometers.

Figure 9:
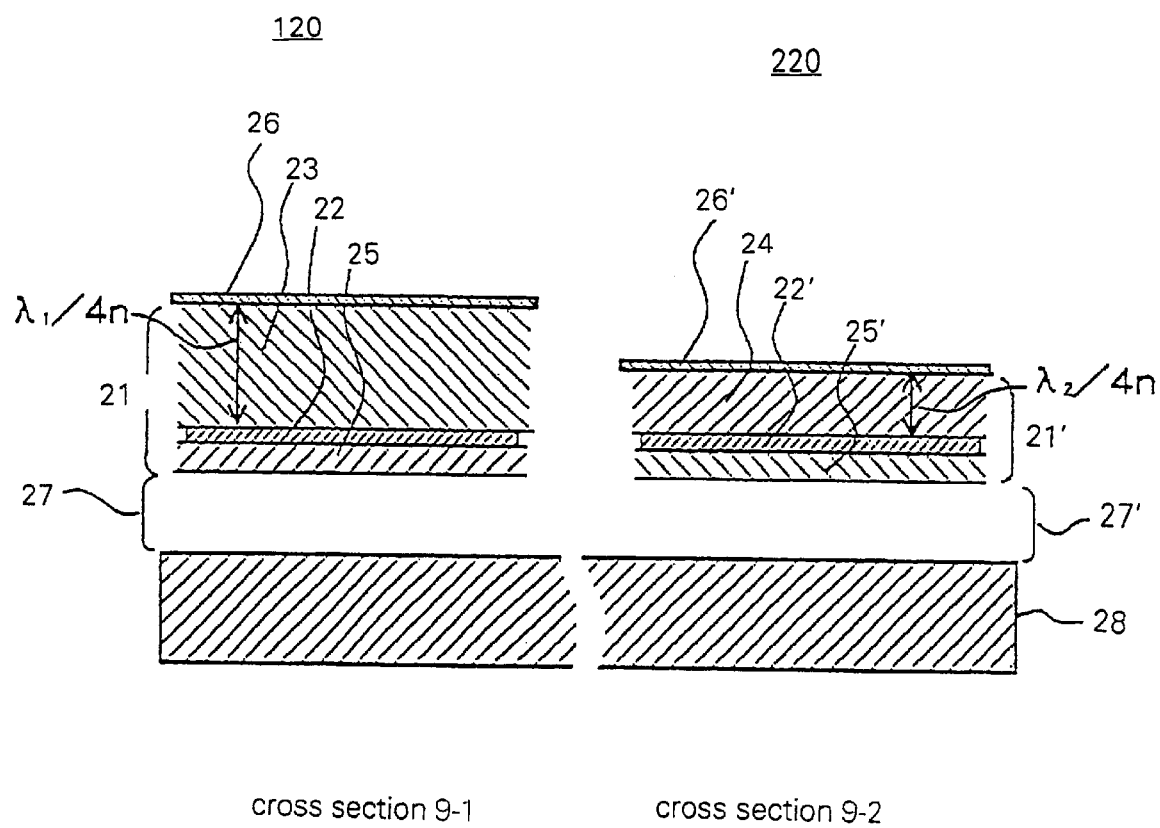
FIG. 9 is a fragmentary cross sectional elevation view illustrative of a third novel thermistor bolometer thermal infrared array sensor capable of plural infrared wavelength bands taken along A—A line and B—B line of FIG. 8 in a third embodiment in accordance with the present invention.

FIG. 9 is a fragmentary cross sectional elevation view illustrative of a third novel thermistor bolometer thermal infrared array sensor capable of plural infrared wavelength bands taken along A—A line and B—B line of FIG. 8 in a third embodiment in accordance with the present invention, wherein the adjacent first and second types pixels are illustrated. The bolometer thin film is made of a metal oxide which is transparent to the infrared ray.

A first diaphragm 21 of the first type sensor comprises a first bolometer material thin film 22 sandwiched between first and second protective films 25 and 23. The first read out circuit 4 of the first type pixel is formed in a surface of a substrate 28. No full reflective film is provided on the first surface of the substrate 28. A first cavity 27 is formed between the first diaphragm 21 and the surface of the substrate 28. The first and second protective films 25 and 23 are made of $SiO_2$ which are transparent to the infrared ray. The second protective film 23 is much thicker than the first protective film 25. The first bolometer material thin film 22 comprises either a Ti film having a thickness of 1000 angstroms or a Pt film having a thickness of 400 angstroms, so that the first bolometer material thin film 22 serves as a reflective film for reflecting the infrared ray. A first infrared absorption thin film 26 is provided on the first diaphragm 21 or on the second protective film 23. The first infrared absorption thin film 26 has a vacuum impedance matching. The first infrared absorption thin film 26 may comprise either a TiN layer having a thickness of about 150 angstroms or an NiFe layer having a thickness of about 30 angstroms. The first infrared absorption thin film 26 has a sheet resistance of 377 ohms. The second protective film 23 has an optically effective thickness of about 2.5 micrometers and a dimensional thickness of 2 micrometers.

An infrared ray 1 is incident into the first diaphragm 21. A part of the incident infrared ray is transmitted through the first infrared absorption thin film 26 and the second protective layer 23 to the first bolometer material thin film 22 serving as the reflective film, so that the part of the transmitted infrared ray is reflected by the first bolometer material thin film 22 serving as the reflective film. The reflected infrared ray is then transmitted through the second protective layer 23 to the first infrared absorption thin film 26, where the reflected infrared ray and the incident infrared ray show an interference to cancel to each other in the first infrared absorption thin film 26, whereby the infrared ray is absorbed into the first infrared absorption thin film 26. A distance between the first infrared absorption thin film 26 and the first bolometer material thin film 22 serving as the reflective film is set to be λ 1/4n, for example, one quarter of the first wavelength band of the first infrared ray which is to be detected by the first type sensor 120. For example, if the distance between the first infrared absorption thin film 26 and the first bolometer material thin film 22 serving as the reflective film is set to be 2.5 micrometers in optionally effective thickness, then the first type sensor 120 can detect an infrared ray of 10 micrometers wavelength band. If the second protective film 23 is made of $SiO_2$, the thickness of the second protective film 23 may be 2 micrometers. It is possible to change the wavelength band of the infrared ray to be detected by the first type sensor 120 by changing the thickness of the second protective film 23. The absorption of the infrared ray causes variation in temperature of the first diaphragm 21, whereby a resistance of the bolometer in the first diaphragm 21 is changed, thereby causing a voltage variation This voltage variation is converted into electrical signals which are to be processed for imaging.

A second diaphragm 21' of the second type sensor 220 comprises a second bolometer material thin film 22 sandwiched between first and second protective films 25' and 24. The second read out circuit 4' of the second type sensor 220 is formed on the surface of the substrate 28. No full reflective film is provided on the surface of the substrate 28. A second cavity 27' is formed between the second diaphragm 21' and the surface of the substrate 28. The first and second protective films 25' and 24 are made of $SiO_2$ which are transparent to the infrared ray. The second bolometer material thin film 22' comprises either a Ti film having a thickness of 1000 angstroms or a Pt film having a thickness of 400 angstroms, so that the second bolometer material thin film 22' serves as a reflective film for reflecting the infrared ray. A second infrared absorption thin film 26' is provided on the second diaphragm 21' or on the second protective film 24. The second infrared absorption thin film 26' has a vacuum impedance matching. The second infrared absorption thin film 26' may comprise either a TiN layer having a thickness of about 150 angstroms or an NiFe layer having a thickness of about 30 angstroms. The second infrared absorption thin film 26' has a sheet resistance of 377 ohms. The first cavity 27 of the first type sensor 120 is the same in length as the second cavity 27' of the second type sensor 220. The second protective film 24 has an optically effective thickness of about 1 micrometers and a dimensional thickness of 0.7 micrometers.

An infrared ray 1 is incident into the second diaphragm 21. A part of the incident infrared ray is transmitted through the second infrared absorption thin film 26' and the second protective layer 23 to the second bolometer material thin film 22' serving as the reflective film, so that the part of the transmitted infrared ray is reflected by the second bolometer material thin film 22' serving as the reflective film. The reflected infrared ray is then transmitted through the second protective layer 24 to the second infrared absorption thin film 26', where the reflected infrared ray and the incident infrared ray show an interference to cancel to each other in the second infrared absorption thin film 26', whereby the infrared ray is absorbed into the second infrared absorption thin film 26'. A distance between the second infrared absorption thin film 26' and the second bolometer material thin film 22' serving as the reflective film is set to be λ 2/4n, for example, one quarter of the second wavelength band of the second infrared ray which is to be detected by the second type sensor 120. For example, if the distance between the second infrared absorption thin film 26' and the second bolometer material thin film 22' serving as the reflective film is set to be 1 micrometer in optionally effective thickness, then the second type sensor 120 can detect an infrared ray of 4 micrometers wavelength band. If the second protective film 24 is made of $SiO_2$, the thickness of the second protective film 24 may be 0.7 micrometers. It is possible to change the wavelength band of the infrared ray to be detected by the second type sensor 120 by changing the thickness of the second protective film 24. The absorption of the infrared ray causes variation in temperature of the second diaphragm 21', whereby a resistance of the bolometer in the second diaphragm 21' is changed, thereby causing a voltage variation. This voltage variation is converted into electrical signals which are to be processed for imaging.

Accordingly, the above first and second sensors 120 and 220 having the first ands second diaphragms 21 and 21' are capable of detecting infrared rays of two different wavelength bands. Since the above first and second sensors 120 and 220 are distributed over the entire of the array, the third novel thermistor bolometer thermal infrared array sensor can detect the infrared rays of different wavelength bands.

In this embodiment, the first and second sensors 120 and 220 are provided to detect two different wavelength bands infrared rays. It is, however, possible to modify the third novel thermistor bolometer thermal infrared array sensor by providing three or more different type sensors which are capable of detecting infrared rays of three or more different wavelength bands.

Fourth Embodiment

Figure 10:
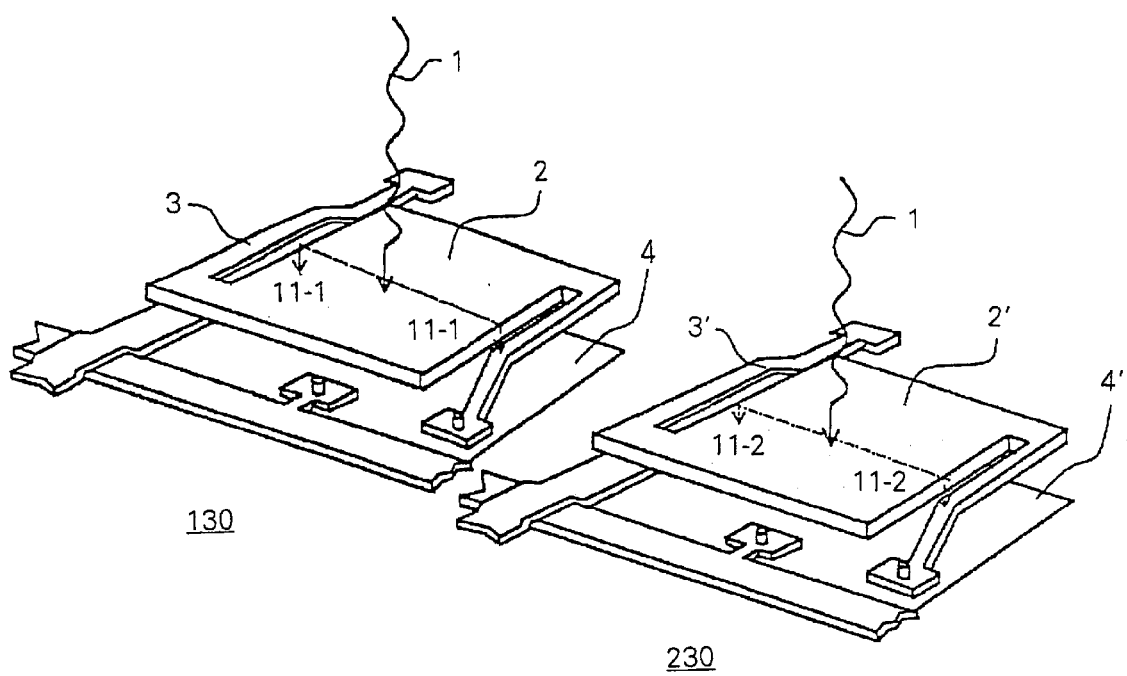
FIG. 10 is a schematic perspective view illustrative of first and second type sensors having first ands second diaphragms for detecting infrared rays of different wavelength bands in a fourth novel thermistor bolometer thermal infrared array sensor in a fourth embodiment in accordance with the present invention.

A fourth embodiment according to the present invention will be described in detail with reference to the drawings. FIG. 10 is a schematic perspective view illustrative of first and second type sensors having first ands second diaphragms for detecting infrared rays of different wavelength bands in a fourth novel thermistor bolometer thermal infrared array sensor in a fourth embodiment in accordance with the present invention. The fourth novel thermistor bolometer thermal infrared array sensor has an array of first and second type sensors 130 and 230. The first and second type sensors 130 and 230 are arranged to form a two-dimensional array. The first type sensors 130 are almost uniformly distributed over an entire region of the array and the second type sensors 230 are almost uniformly distributed over the entire region of the array. The first and second type sensors 130 and 230 are different in wavelength band of the infrared rays to be detected by them. Each of the first type sensor 130 comprises a first diaphragm 30 which is supported and floated by first beams 3 over a read out circuit board 4. Each of the second type sensor 230 comprises a second diaphragm 30' which is supported and floated by second beams 3' over the read out circuit board 4. Each of the first and second type sensors 130 and 230 corresponds to each pixel of the thermistor bolometer thermal infrared array sensor. A size of the each pixel is in the range of 30–100 micrometers.

Figure 11:
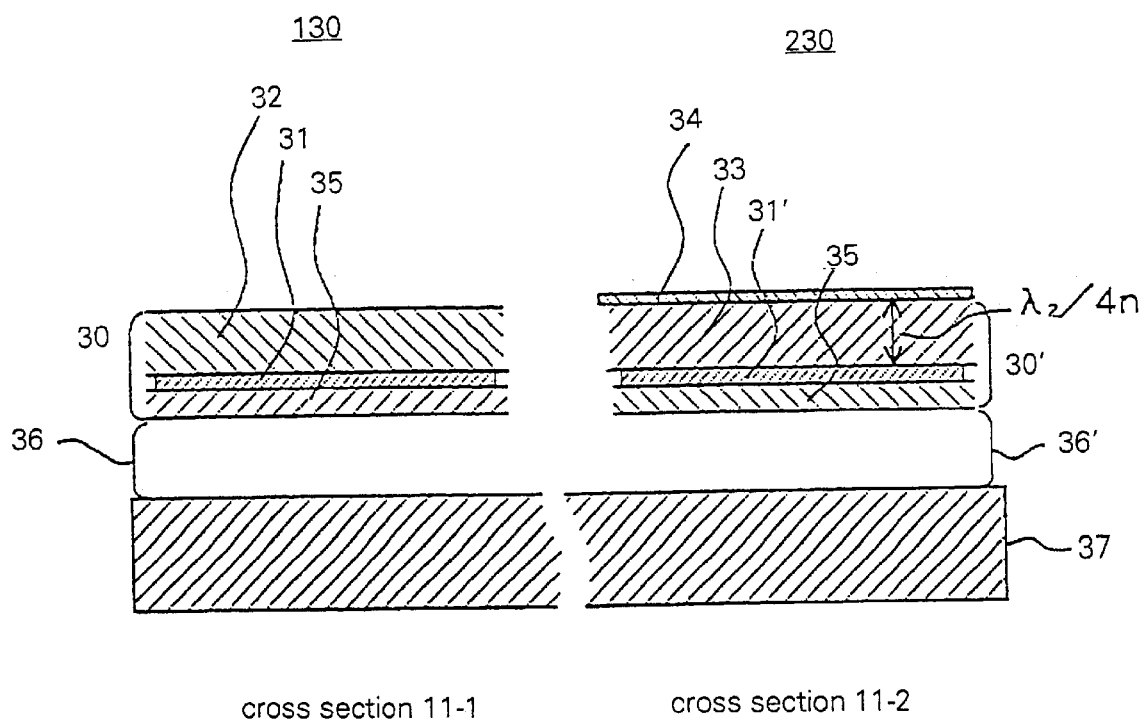
FIG. 11 is a fragmentary cross sectional elevation view illustrative of a fourth novel thermistor bolometer thermal infrared array sensor capable of plural infrared wavelength bands taken along A—A line and B—B line of FIG. 10 in a fourth embodiment in accordance with the present invention.

FIG. 11 is a fragmentary cross sectional elevation view illustrative of a fourth novel thermistor bolometer thermal infrared array sensor capable of plural infrared wavelength bands taken along A—A line and B—B line of FIG. 10 in a fourth embodiment in accordance with the present invention, wherein the adjacent first and second types pixels are illustrated. The bolometer thin film is made of a metal oxide which is transparent to the infrared ray.

A first diaphragm 30 of the first type pixel comprises a first bolometer material thin film 31 sandwiched between first and second protective films 35 and 32 The first bolometer material thin film 31 comprises either a Ti film having a thickness of 1000 angstroms or a Pt film having a thickness of 400 angstroms, so that the first bolometer material thin film 31 serves as a reflective film for reflecting the infrared ray. The first read out circuit 4 of the first type pixel is formed in a surface of a substrate 37. No full reflective film is provided on the surface of the substrate 37. A first cavity 36 is formed between the first diaphragm 30 and the surface of the substrate 37 The first and second protective films 35 and 32 are made of SiN and have a total thickness of about 5000 angstroms. The second protective film 32 absorbs an infrared ray of a wavelength band of 10 micrometers. A size of the cavity 36 or a distance between the first diaphragm 30 and the full reflective film 8 is not limited.

The infrared ray is incident into the first diaphragm 30. A part of the incident infrared ray is absorbed into the second protective film 32. A remaining part of the incident infrared ray is transmitted through the second protective film 32 to the first bolometer material thin film 31 serving as a reflective film, so that the remaining part of the incident infrared ray is reflected by the first bolometer material thin film 31. The reflected infrared ray is absorbed into the second protective film 32. The absorption of the infrared ray causes variation in temperature of the first diaphragm 30, whereby a resistance of the bolometer in the first diaphragm 30 is changed, thereby causing a voltage variation. This voltage variation is converted into electrical signals which are to be processed for imaging.

A second diaphragm 30' of the second type sensor 230 comprises a second bolometer material thin film 31' sandwiched between first and second protective films 35 and 33. The second read out circuit 4' of the second type sensor 230 is formed on the surface of the substrate 37, No full reflective film is provided on the surface of the substrate 37. A second cavity 36' is formed between the second diaphragm 30' and the surface of the substrate 37. The first and second protective films 35 and 33 are made of $SiO_2$ which are transparent to the infrared ray. The second bolometer material thin film 31' comprises either a Ti film having a thickness of 1000 angstroms or a Pt film having a thickness of 400 angstroms, so that the second bolometer material thin film 31' serves as a reflective film for reflecting the infrared ray. An infrared absorption thin film 34 is provided on the second diaphragm 30' or on the second protective film 33. The infrared absorption thin film 34 has a vacuum impedance matching. The infrared absorption thin film 34 may comprise either a TiN layer having a thickness of about 150 angstroms or an NiFe layer having a thickness of about 30 angstroms. The infrared absorption thin film 34 has a sheet resistance of 377 ohms. The first cavity 36 of the first type sensor 130 is the same in length as the second cavity 36' of the second type sensor 230. The second protective film 33 has an optically effective thickness of about 1 micrometers and a dimensional thickness of 0.7 micrometers.

An infrared ray 1 is incident into the second diaphragm 30'. A part of the incident infrared ray is transmitted through the infrared absorption thin film 34 and the second protective layer 33 to the second bolometer material thin film 31' serving as the reflective film, so that the part of the transmitted infrared ray is reflected by the second bolometer material thin film 31' serving as the reflective film. The reflected infrared ray is then transmitted through the second protective layer 33 to the infrared absorption thin film 34, where the reflected infrared ray and the incident infrared ray show an interference to cancel to each other in the infrared absorption thin film 34, whereby the infrared ray is absorbed into the infrared absorption thin film 34. A distance between the infrared absorption thin film 34 and the second bolometer material thin film 31' serving as the reflective film is set to be λ 2/4n, for example, one quarter of the second wavelength band of the second infrared ray which is to be detected by the second type sensor 130. For example, if the distance between the infrared absorption thin film 34 and the second bolometer material thin film 31' serving as the reflective film is set to be 1 micrometer in optionally effective thickness, then the second type sensor 130 can detect an infrared ray of 4 micrometers wavelength band. If the second protective film 33 is made of $SiO_2$, the thickness of the second protective film 33 may be 0.7 micrometers. It is possible to change the wavelength band of the infrared ray to be detected by the second type sensor 130 by changing the thickness of the second protective film 33. The absorption of the infrared ray causes variation in temperature of the second diaphragm 30', whereby a resistance of the bolometer in the second diaphragm 30' is changed, thereby causing a voltage variation. This voltage variation is converted into electrical signals which are to be processed for imaging.

Accordingly, the above first and second sensors 130 and 230 having the first ands second diaphragms 30 and 30' are capable of detecting infrared rays of two different wavelength bands. Since the above first and second sensors 130 and 230 are distributed over the entire of the array, the fourth novel thermistor bolometer thermal infrared array sensor can detect the infrared rays of different wavelength bands.

In this embodiment, the first and second sensors 130 and 230 are provided to detect two different wavelength bands infrared rays. It is, however, possible to modify the fourth novel thermistor bolometer thermal infrared array sensor by providing three or more different type sensors which are capable of detecting infrared rays of three or more different wavelength bands.

Fifth Embodiment

Figure 12:
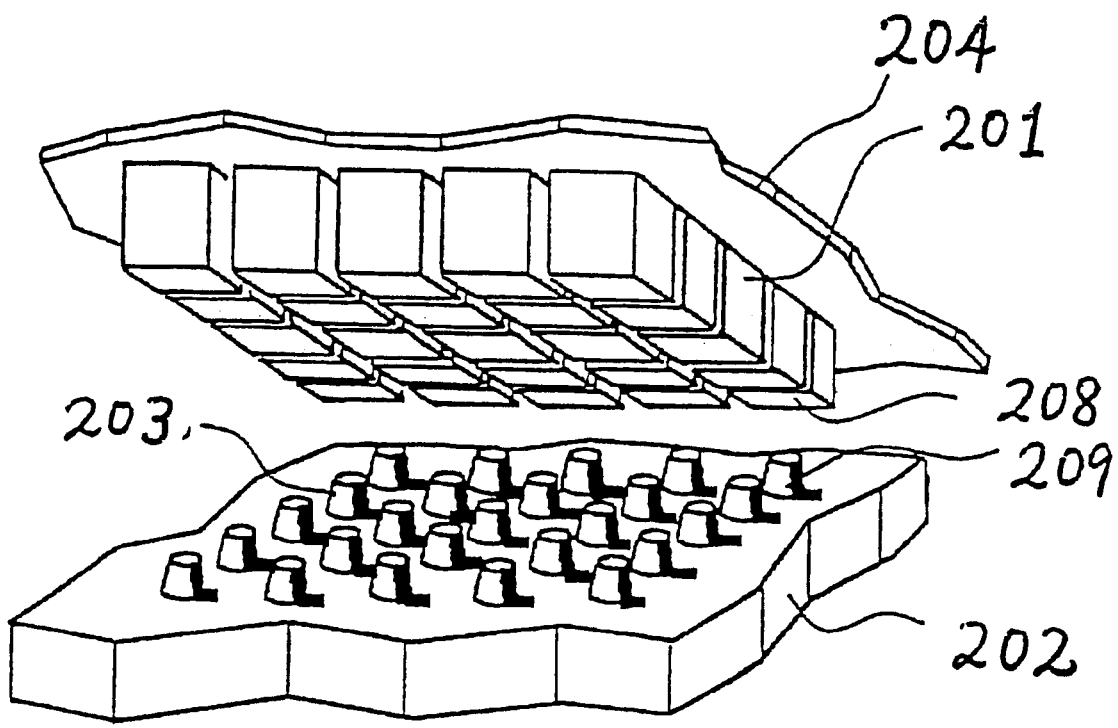
FIG. 12 is a schematic perspective view illustrative of a first novel ferroelectric infrared array sensor in a fifth embodiment in accordance with the present invention.

A fifth embodiment according to the present invention will be described in detail with reference to the drawings. FIG. 12 is a schematic perspective view illustrative of a first novel ferroelectric infrared array sensor in a fifth embodiment in accordance with the present invention. The first novel ferroelectric infrared array sensor has a hybrid structure of ferroelectric ceramics 201 and a substrate 202 having a read out circuit which are electrically connected via bumps 203. An array of the ferroelectric ceramics 201 is provided on an infrared absorption layer 204. Electrodes 208 are provided on the ferroelectric ceramics 201. The electrodes 208 are electrically connected through the bumps 203 to the read out circuit on the substrate 202.

Figure 13:
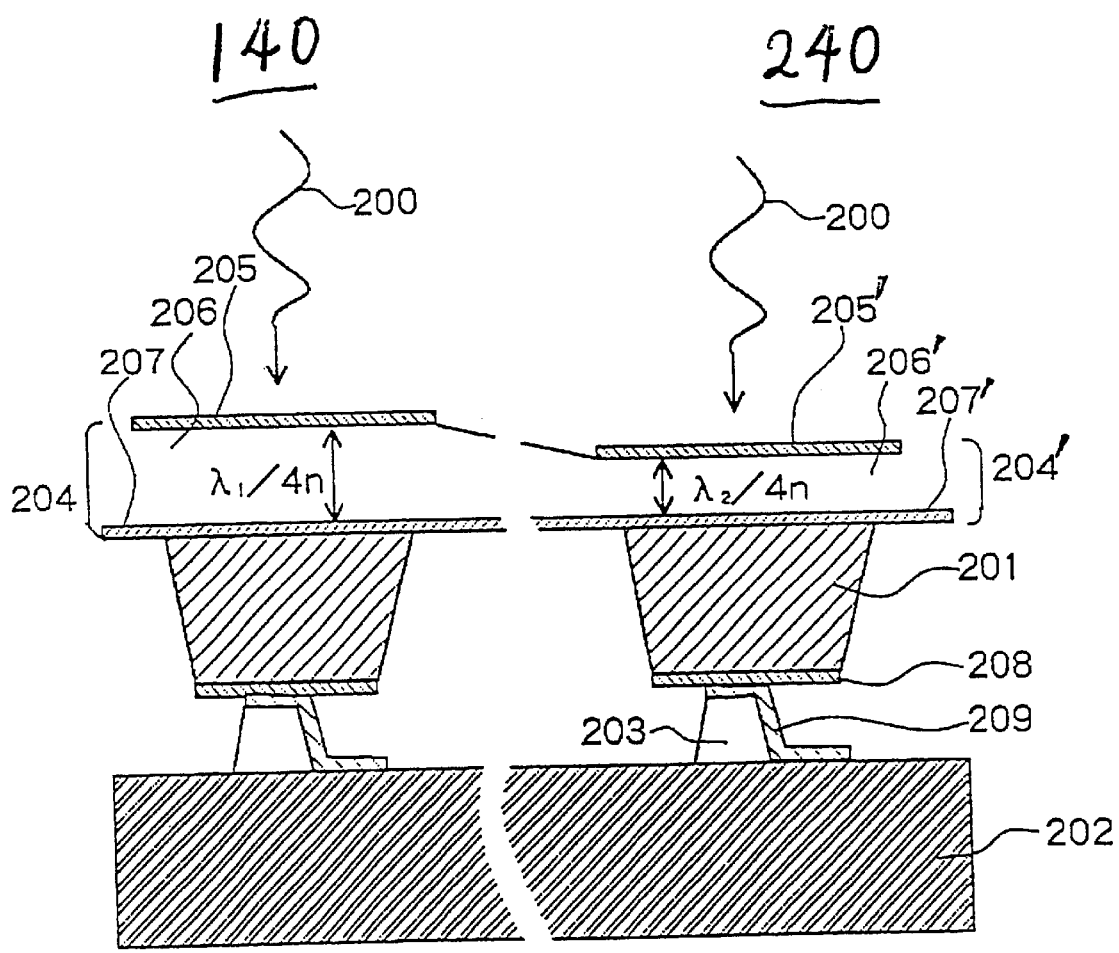
FIG. 13 is a fragmentary cross sectional elevation view illustrative of first and second type sensors detecting infrared rays having different two wavelength bands in the first novel ferroelectric infrared array sensor of FIG. 12.

FIG. 13 is a fragmentary cross sectional elevation view illustrative of first and second type sensors detecting infrared rays having different two wavelength bands in the first novel ferroelectric infrared array sensor of FIG. 12. The first novel ferroelectric infrared array sensor has an array of first and second type sensors 140 and 240. The first and second type sensors 140 and 240 are arranged to form a two-dimensional array. The first type sensors 140 are almost uniformly distributed over an entire region of the array and the second type sensors 240 are almost uniformly distributed over the entire region of the array. The first and second type sensors 140 and 240 are different in wavelength band of the infrared rays to be detected by them. Each of the first type sensor 140 comprises a first infrared absorption layer 204, the ferroelectric ceramic 201, and the bump 203 with an electrical wiring 209 over the substrate 202. Each of the second type sensor 240 comprises a second infrared absorption layer 204', the ferroelectric ceramic 201, and the bump 203 with an electrical wiring 209 over the substrate 202. Each of the first and second type sensors 140 and 240 corresponds to each pixel of the ferroelectric infrared array sensor.

The first infrared absorption layer 204 comprises a first cavity layer 206 having a first surface on which a first infrared absorption film 205 is provided and a second surface opposite to the first surface, where on the second surface, a first full reflective film 207 is provided. The ferroelectric ceramic 201 is provided on the first full reflective film 207. The bump 203 has an electric wiring 209 for electrically connect the electrode 208 to the read out circuit on the substrate 202, The ferroelectric ceramic 201 may be made of (Ba, Sr)TiO$_3$. The bump 203 may be made of polyimide. The first infrared absorption thin film 205 is provided on the first cavity layer 206. The first infrared absorption thin film 205 has a vacuum impedance matching. The first infrared absorption thin film 205 may comprise either a TiN layer having a thickness of about 150 angstroms or an NiFe layer having a thickness of about 30 angstroms. The first infrared absorption thin film 205 has a sheet resistance of 377 ohms. The first cavity layer 206 is transparent to the infrared ray. The first full reflective film 207 also serves as a common electrode. The first full reflective film 207 may comprise a metal film such as Ti having a thickness of 2000 angstroms. The first infrared absorption thin film 205 is separated from adjacent infrared absorption thin films to increase thermal isolation between adjacent pixels and also prevent any substantive cross-talk between adjacent pixels.

An infrared ray 200 is incident into the infrared absorption layer 205. A part of the incident infrared' ray 200 is transmitted through the first infrared absorption film 205 and the first cavity layer 206 to the first full reflective film 207. The infrared ray 200 is reflected by the first full reflective film 207 and then transmitted through the first cavity layer 206 to the first infrared absorption film 205. The reflected infrared ray 200 and the incident infrared ray 200 show an interference to cancel to each other in the first infrared absorption film 205, so that the infrared ray 200 is absorbed into the first infrared absorption film 205. The absorbed infrared rays are converted into a heat which causes a variation in dielectric constant of the ferroelectric ceramic 201 of (Ba, Sr)TiO$_3$. The variation of the dielectric constant of the ferroelectric ceramic 201 causes a voltage variation.

A distance between the first infrared absorption thin film 205 and the first full reflective film 207 is set to be λ 1/4n, for example, one quarter of the first wavelength band of the first infrared ray which is to be detected. For example, if the distance between the first infrared absorption thin film 205 and the first full reflective film 207 or a thickness of the first cavity layer 206 made of polyimide is set to be 1.4 micrometers, then the first type sensor can detect an infrared ray of 10 micrometers wavelength band. It is possible to change the wavelength band of the infrared ray to be detected by the first type sensor by changing the thickness of the first cavity layer 206. The absorption of the infrared ray causes variation in dielectric constant of the ferroelectric ceramic 201, whereby the variation in dielectric constant of the ferroelectric ceramic 201 is converted into electrical signals to be processed for imaging process.

The second infrared absorption layer 204' comprises a second cavity layer 206' having a second surface on which a second infrared absorption film 205' is provided and a second surface opposite to the second surface, where on the second surface, a second full reflective film 207' is provided. The ferroelectric ceramic 201 is provided on the second fill reflective film 207'. The bump 203 has an electric wiring 209 for electrically connect the electrode 208 to the read out circuit on the substrate 202. The ferroelectric ceramic 201 may be made of (Ba, Sr)TiO$_3$. The bump 203 may be made of polyimide. The second infrared absorption thin film 205' is provided on the second cavity layer 206'. The second infrared absorption thin film 205' has a vacuum impedance matching. The second infrared absorption thin film 205' may comprise either a TiN layer having a thickness of about 150 angstroms or an NiFe layer having a thickness of about 30 angstroms. The second infrared absorption thin film 205' has a sheet resistance of 377 ohms. The second cavity layer 206' is transparent to the infrared ray. The second full reflective film 207' also serves as a common electrode. The second full reflective film 207' may comprise a metal film such as Ti having a thickness of 2000 angstroms. The second infrared absorption thin film 205' is separated from adjacent infrared absorption thin films to increase thermal isolation between adjacent pixels and also prevent any substantive cross-talk between adjacent pixels.

An infrared ray 200 is incident into the second infrared absorption layer 205'. A part of the incident infrared ray 200 is transmitted through the second infrared absorption film 205' and the second cavity layer 206' to the second full reflective film 207'. The infrared ray 200 is reflected by the second full reflective film 207' and then transmitted through the second cavity layer 206' to the second infrared absorption film 205'. The reflected infrared ray 200 and the incident infrared ray 200 show an interference to cancel to each other in the second infrared absorption film 205', so that the infrared ray 200 is absorbed into the second infrared absorption film 205'. The absorbed infrared rays are converted into a heat which causes a variation in dielectric constant of the ferroelectric ceramic 201 of (Ba, Sr)TiO$_3$. The variation of the dielectric constant of the ferroelectric ceramic 201 causes a voltage variation.

A distance between the second infrared absorption thin film 205' and the second full reflective film 207' is set to be λ 2/4n, for example, one quarter of the second wavelength band of the second infrared ray which is to be detected. For example, if the distance between the second infrared absorption thin film 205' and the second full reflective film 207' or a thickness of the second cavity layer 206' made of polyimide is set to be 0.56 micrometers, then the second type sensor can detect an infrared ray of 4 micrometers wavelength band. It is possible to change the wavelength band of the infrared ray to be detected by the second type sensor by changing the thickness of the second cavity layer 206'. The absorption of the infrared ray causes variation in dielectric constant of the ferroelectric ceramic 201, whereby the variation in dielectric constant of the ferroelectric ceramic 201 is converted into electrical signals to be processed for imaging process.

Accordingly, the above first and second sensors 140 and 240 are capable of detecting infrared rays of two different wavelength bands. Since the above first and second sensors 140 and 240 are distributed over the entire of the array, the fifth novel ferroelectric infrared array sensor can detect the infrared rays of different wavelength bands.

In this embodiment, the first and second sensors 140 and 240 are provided to detect two different wavelength bands infrared rays. It is, however, possible to modify the fifth novel thermistor bolometer thermal infrared array sensor by providing three or more different type sensors which are capable of detecting infrared rays of three or more different wavelength bands.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. An array of infrared (IR) sensors, comprising:

plural first IR sensors on one substrate and plural second IR sensors on said one substrate, said first IR sensors detecting IR rays of a first wavelength band and said second IR sensors detecting IR rays of a second wavelength band different from said first wavelength band, said first and second IR sensors each comprising a diaphragm that is separated from said one substrate by a hollow cavity that isolates said substrate from said diaphragm, said diaphragm in each of said first and second IR sensors including a bolometer material film, said diaphragm in each of said first IR sensors having a first thickness and said diaphragm in each of said second IR sensors having a second thickness different from said first thickness, and said cavity in each of said first and second IR sensors having the same height.

2. The array of claim 1, wherein said diaphragm in each of said plural first sensors comprises a first IR absorption layer absorbing IR rays of a first wavelength, and said diaphragm in each of said plural second sensors comprises a second IR absorption layer absorbing IR rays of a second wavelength that is different from said first wavelength.

3. The array of claim 2, wherein said first IR absorption layer is thicker than said second IR absorption layer.

4. The array of claim 2, wherein said first IR absorption layer comprises a laminate of a protective layer and an IR absorption film.

5. The array of claim 4, wherein said second IR absorption layer comprises a protective film that is also IR absorptive.

6. An array of infrared (IR) sensors, comprising:

plural first IR sensors and plural second IR sensors on one substrate, each of said first and second IR sensors comprising a diaphragm and an IR reflective film on said one substrate, said diaphragm being separated from said IR reflective film by a hollow cavity and having a bolometer material film between an IR absorption layer on a first side facing away from said cavity and a protective layer on a second side facing said cavity, said bolometer material film being spaced a same first distance from said IR reflective film in both said first and second IR sensors, the array being arranged to receive IR rays on said IR absorption layer, said IR absorption layer in each of said plural first sensors absorbing IR rays of a first wavelength; and said IR absorption layer in each of said plural second sensors absorbing IR rays of a second wavelength that is different from said first wavelength.

7. The array of claim 6, wherein said IR absorption layer in each of said plural first sensors is thicker than said IR absorption layer in each of said plural second sensors.

8. The array of claim 6, wherein said IR absorption layer in each of said plural first sensors comprises a laminate of a protective layer and an IR absorption film.

9. The array of claim 8, wherein said IR absorption layer in each of said plural second sensors comprises a protective film that is also IR absorptive.

10. An array of infrared (IR) sensors, comprising:

plural first IR sensors and plural second IR sensors on one substrate, each of said first and second IR sensors comprising a diaphragm on said one substrate, said diaphragm being separated from said one substrate by a hollow cavity and having a bolometer material film that is also an IR reflector between a first protective layer on a first side facing away from said cavity and a second protective layer on a second side facing said cavity, said bolometer material film being spaced a same first distance from said one substrate in both said first and second IR sensors, said diaphragm further having an IR absorption layer on said first protective layer, the array being arranged to receive IR rays on said IR absorption layer, said first protective layer being thicker than said second protective layer so that said first protective layer and said IR absorption layer in each of said plural first sensors absorb IR rays of a first wavelength and said first protective layer and IR absorption layer in each of said plural second sensors absorb IR rays of a second wavelength that is different from said first wavelength.

* * * * *